Figure 1:
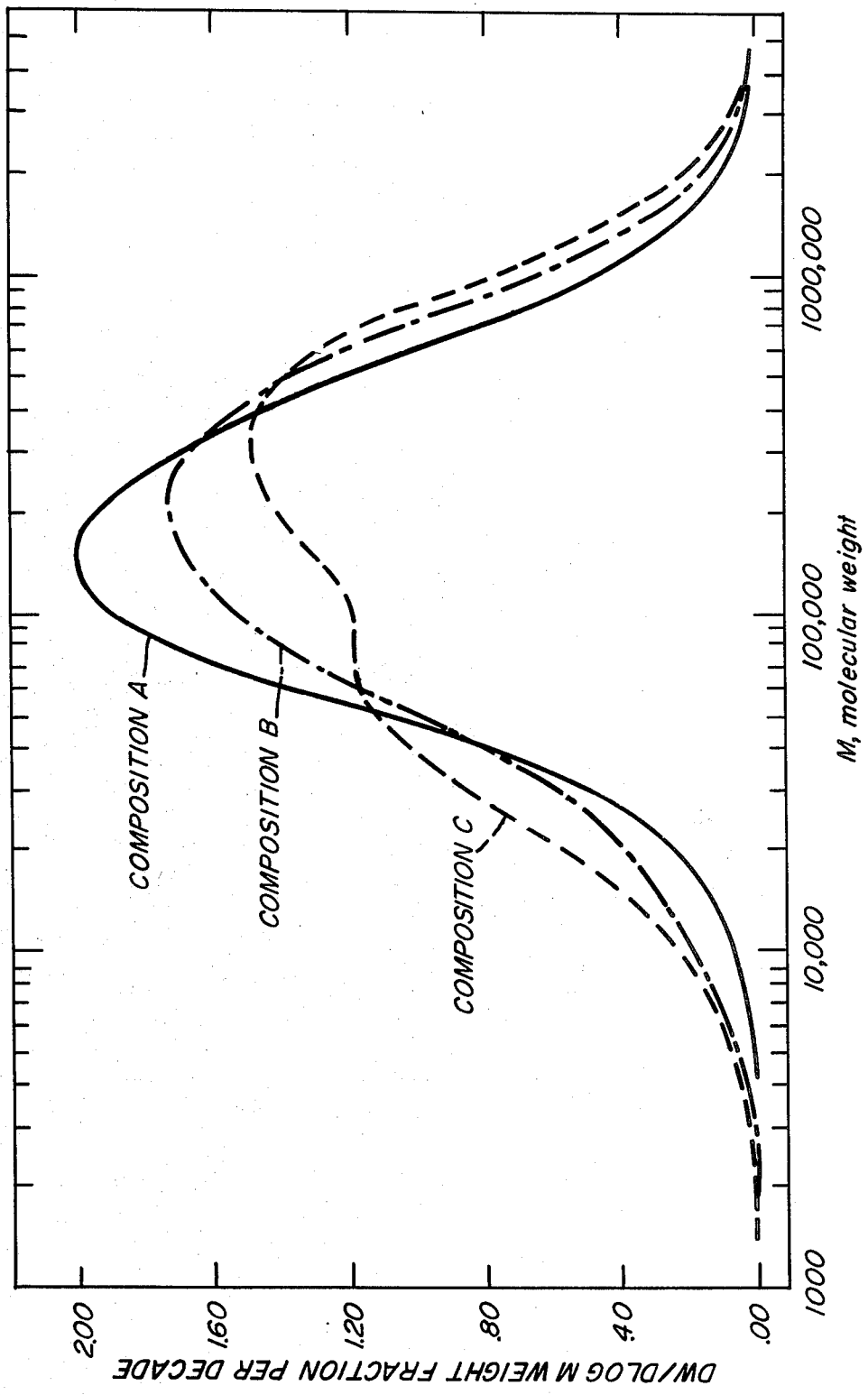

United States Patent [19]

Cutter

[11] 4,137,388
[45] Jan. 30, 1979

[54] POLYSTYRENE WITH DISTINCT MOIETIES OF MOLECULAR WEIGHT DISTRIBUTION

[75] Inventor: Louis A. Cutter, Pittsburgh, Pa.

[73] Assignee: United States Steel Corporation, Pittsburgh, Pa.

[21] Appl. No.: 867,394

[22] Filed: Jan. 6, 1978

[51] Int. Cl.$^2$ .......................... C08F 2/18; C08F 4/38; C08F 112/08

[52] U.S. Cl. ........................ 526/73; 526/78; 526/87; 526/228; 526/346; 526/909; 526/910; 260/886

[58] Field of Search ............ 526/228, 73, 346, 86, 526/87, 78; 260/886

[56] References Cited

U.S. PATENT DOCUMENTS

| | | | |
|---|---|---|---|
| 2,545,702 | 3/1951 | Norris | 260/886 |
| 2,656,334 | 10/1953 | Alelio | 526/73 |
| 2,907,756 | 10/1959 | Doak | 526/73 |
| 3,052,664 | 9/1962 | Cleland et al. | 260/886 |
| 3,252,950 | 5/1966 | Terenzi et al. | 526/73 |
| 3,293,233 | 12/1966 | Erchak et al. | 526/73 |
| 3,681,305 | 8/1972 | Tirpak et al. | 526/228 |
| 3,726,846 | 4/1973 | Squire et al. | 526/228 |
| 3,726,848 | 4/1973 | Squire et al. | 526/73 |
| 3,817,965 | 6/1974 | Mace et al. | 526/228 |

FOREIGN PATENT DOCUMENTS

| | | | |
|---|---|---|---|
| 848620 | 9/1960 | United Kingdom | 526/73 |
| 1243197 | 8/1971 | United Kingdom | 526/73 |

OTHER PUBLICATIONS

Polymer Science, USSR, vol. 14, #5, 1972, pp. 1143–1153.

Primary Examiner—Herbert J. Lilling
Attorney, Agent, or Firm—William L. Krayer

[57] ABSTRACT

Crystal polystyrene with improved flow properties useful in injection molding is prepared in a two-stage process in which a first portion of monomer is polymerized in the presence of about 0.3 to about 2.0% peroxide initiator to convert about 70 to 95% of the monomer present to polymer having a number average molecular weight of 20,000 to 50,000 and a weight average of 50,000 to 100,000; then adding the rest of the monomer thereby reducing the catalyst concentration to generate a second moiety of polymer so that the final product has a weight average molecular weight of 150,000–300,000, and a number average of 50,000–70,000.

6 Claims, 2 Drawing Figures

POLYSTYRENE WITH DISTINCT MOIETIES OF MOLECULAR WEIGHT DISTRIBUTION

BACKGROUND OF THE INVENTION

This invention relates in general to crystal polystyrenes produced by suspension polymerization, and more particularly to a method of improving the behavior of said polystyrenes in injection molding by employing two distinct distributions of molecular weight.

It is known that in order to improve the behavior of polystyrenes produced by suspension polymerization on injection molding, a molecular weight distribution is desirable that is broader than usually obtained by suspension polymerization. The presence of low molecular weight species improves the rate of melt flow at low temperature, while high molecular weight constituents are necessary to obtain adequate strength and to avoid excessive brittleness. Polymers of broad molecular weight distribution tend to have melt flow rates highly sensitive to shear stress and to have broad ranges of moldability (both temperature and pressure).

Polymers of broad and typically single-peaked molecular weight distribution with a number average molecular weight in the range 60,000 to 75,000 and weight average molecular weight of 200,000 to 300,000 are available commercially but are not made by suspension polymerization, a process which offers considerable advantages in simplicity and flexibility. Low molecular weight suspension polymers are made, but do not have the broad molecular weight distribution desired.

It is therefore the object of my invention to broaden the molecular weight distribution for polystyrene.

Another object of my invention is to provide polystyrenes with improved characteristics for injection molding without undue sacrifice of physical properties.

A further object of my invention is to provide a broad molecular weight distribution in polystyrenes made by suspension polymerization.

These and other objects and advantages of my invention will become more apparent from the following detailed description.

SUMMARY OF THE INVENTION

According to my invention, an easy flowing polystyrene with two distinct moieties of molecular distribution can be made by polymerizing styrene in the presence of at least one low temperature free radical initiator, for example benzoyl peroxide, and at least one high temperature initiator, for example tertiary butyl perbenzoate. The polymerization is run initially so that large amounts of low molecular weight polystyrene are produced at the beginning of the cycle and high molecular weight polystyrene is made during the later stages. Specifically, the following steps are taken to produce low molecular weight polystyrene at the beginning of the cycle.

1. A concentration of low temperature initiator of at least 0.05 parts per 100 parts of styrene is used at temperatures between about 85–110° C so that the half-life of the initiator is about 0.5–2 hours.

2. The concentration of the initiator is increased by withholding a portion (i.e. from about 50% to about 75%) of the styrene from the reactor until a significant amount of polymerization has occurred, i.e. at least about 70% (no more than 95%) of the styrene present. In this way, an increased concentration of initiator is maintained during the early part of the polymerization without increasing the total consumption of these costly ingredients. Since less than the normal amount of styrene is present compared to the initiator, a higher rate of polymerization can be tolerated without the heat of polymerization exceeding the cooling capacity of the reactor jacket and running the risk of an uncontrollable reaction.

Many initiators may be employed. As is known in the art, initiators may be selected for their relatively short or long half-life at various temperatures, and are generally known as low-temperatures or high-temperature initiators. I may use any of the known peroxy initiators, such as benzoyl peroxide, t-butyl peroctoate, and lauroyl peroxide. A desirable low-temperature initiator from the standpoint of low cost and a convenient activity at the operating temperature is benzoyl peroxide, which has a one hour half-life at about 93° C and about 2.15 hours at 85° C. If benzoyl peroxide is employed, a concentration of at least 0.05 parts benzoyl peroxide per 100 parts of styrene should be employed (based on total styrene including that withheld initially). Preferably, benzoyl peroxide should be added at a concentration of 0.3 to 0.5 parts per 100 parts styrene. The lower limit of benzoyl peroxide is based on an amount likely to be effective in producing the desired low molecular weight polystyrene at the prevailing temperature. The amount decreases with increasing temperature. At a temperature of 90° C, with approximately half of the styrene withheld, at least 0.3 parts of benzoyl peroxide are expected to be necessary.

Completion of polymerization after the second styrene addition is more or less conventional; the residual low-temperature initiator is employed at first and, as the temperature rises and/or is increased to about 120–150° C, a high-temperature initiator is added, having about a one-hour half-life in the range of 115–145° C, such as t-butyl perbenzoate, dicumyl peroxide and di-t-butyl peroxide.

EXAMPLE I

Reactor — 100 gallon Pfaudler
Initial charge
Reactor
Styrene — 240 pounds
Mineral oil — 12 pounds
Water — 124 pounds
Suspension flush water — 77 pounds
t-Butyl perbenzoate — 36.6 grams
Benzoyl peroxide — 900 grams
Suspension makeup
Water deionized — 103 pounds at 60° C
Calcium chloride — 18.7 grams
Tricalcium phosphate — 1555 grams
Nacconol 90 F — sodium dodecyl benzene sulfonate — 3.46 grams The suspension ingredients were added to the suspension tank in the order listed, water then calcium chloride and at 5-minute intervals tricalcium phosphate and Nacconol 90 F, with agitation. The reactor was charged with styrene, mineral oil, and water, heated to 60° C, and maintained at that temperature while the suspension mixture was added. The suspension was checked and when satisfactory, the benzoyl peroxide and t-butyl perbenzoate were added and the reactor was heated to 90° C over one hour. After one-half hour at 90° C, 160 pounds of additional styrene were added with cooling on the reactor. The reactor was reheated to 90° C and kept at that temperature until the beads were hard enough not to agglomerate in the presence of acetic acid, which required an additional four hours at 90° C. Added to the reactor were 22.5 grams of lime Ca(OH)$_2$, and the mixture heated to 120° C over one hour and maintained at 120° C for 1½ hours. The reactor was then cooled to 60° C. Added to the reactor and allowed to stir one-half hour were 22.5 grams of alconox detergent and 2000 ml concentrated hydrochloric acid. The mixture was then filtered on a Nutsche filter, washed with deionized water and the beads dried in a tray drier at 50° C.

In preparing a high-heat, braod-molecular-weight-distribution polystyrenes (no mineral oil), only a third of the styrene is added at the beginning with the suspending agents and initiators. During this initial period, the suspension is heated to a higher temperature of 94° C (367 K) from 60° C (333 K) over an hour and kept at that temperature for 1.5 hours. At the end of this initial stage the monomer is 80 to 85% polymerized.

A high polymerization rate is tolerated without exceeding the heat-transfer limitations of the reactor when only a third of the styrene is present. The rate of heat evolution is equivalent to that of a polymerization with a rate of 16% per hour with a full charge. At the end of the initial period of 1.5 hours, the remaining monomer is added and the polymerization is continued at 90° C (363 K). Approximately 5% conversion occurs during the styrene addition and heatup period of 0.5 hours. On reheating to 90° C, the conversion is about 33%, and the polymer has an $M_n$ of 25,000 and an $M_w$ of 71,000. The polymerization is continued for about 5.75 additional hours at 90° C until the suspension is stable to acid. During the second portion of the cycle the polymerization rate is much lower (10% per hour), and a polymer with a much higher molecular weight is produced. After a lime addition at the end of the low-temperature cycle, the batch is heated to 129° C (402 K) in an hour and maintained at that temperature for 1.5 hours.

This process accentuates the natural tendency of the polymerization to produce low-molecular-weight polymer at the beginning of the low-temperature cycle, and high-molecular-weight polymer toward the end when the initiator has become depleted and the termination reaction has slowed because of the gel effect.

For easy-flow, bi-level molecular-weight-polystyrenes, the formulation includes four parts 70 SSU viscosity mineral oil per 100 parts total styrene. The polymerization temperature in the initial phase is increased from 94 to 96° C (367 to 369 K). With this change, the benzoyl peroxide is more nearly exhausted at the end of the first phase, and as a result the time required for the second phase is increased to seven hours.

Materials and Equipment

Polymerization materials of Example I are listed in Table I. Polymerizations were run in 50- and 100-gallon (0.19 and 0.38 m$^3$) reactors.

Table I

Formula and Cycle for Polystyrene with Broad Molecular Weight Distribution

| Formula | Parts Per 100 Parts Total Styrene | |
|---|---|---|
| | "High Heat" Composition C | "Easy Flow" Composition F |
| Suspension Make-up | | |
| Water | 27 | 27 |
| Calcium Chloride | 0.01 | 0.01 |
| Tricalcium Phosphate | 0.50 | 0.50 |

Table I-continued

Formula and Cycle for Polystyrene with Broad Molecular Weight Distribution

| Formula | Parts Per 100 Parts Total Styrene | |
|---|---|---|
| | "High Heat" Composition C | "Easy Flow" Composition F |
| Sodium Dodecylbenzene Sulfonate | 0.00085 | 0.00085 |
| Reactor | | |
| Water | 31 | 31 |
| Initial Styrene | 33.5 | 33.5 |
| Mineral Oil | 0 | 4.0 |
| Flush Water | 19.3 | 19.3 |
| Benzoyl Peroxide | 0.48 | 0.48 |
| t-Butyl Perbenzoate | 0.04 | 0.04 |
| Secondary Styrene | 66.5 | 66.5 |
| Lime (at end of low temperature cycle) | 0.0124 | 0.0124 |
| Cycle | | |
| 1 Hour heatup temperature, ° C | 94° C | 96° C |
| Time at temperature, hours | 1.5 | 1.5 |
| Added secondary styrene and reheated to 90° C, hours | 0.5 | 0.5 |
| Maintained at 90° C, hours | 5.75 | 7.0 |
| Heated to 129° C, hours | 1.0 | 1.0 |
| Maintained at 129° C, hours | 1.5 | 1.5 |
| Cooled to 70° C, hours | 1.0 | 1.0 |

Molecular-Weight Distribution

High Heat. The molecular-weight distributions of a pilot-plant high-heat polystyrene of the present invention with broad molecular-weight distribution is plotted in FIG. 1 for comparison with that of a common commercially available high-heat crystal polystyrene ("Composition A"), and a commercial bulk crystal polystyrene of broad molecular weight ("Composition B"). Molecular-weight averages are presented in Table II. The pilot-plant resin differs from Composition A in having a much broader molecular-weight distribution, with a larger fraction of molecular weight above 500,000. It has a bimodal distribution, with one peak at 50,000 and the other at 300,000, but otherwise quite closely duplicates the distribution of Composition B.

Figure 2:
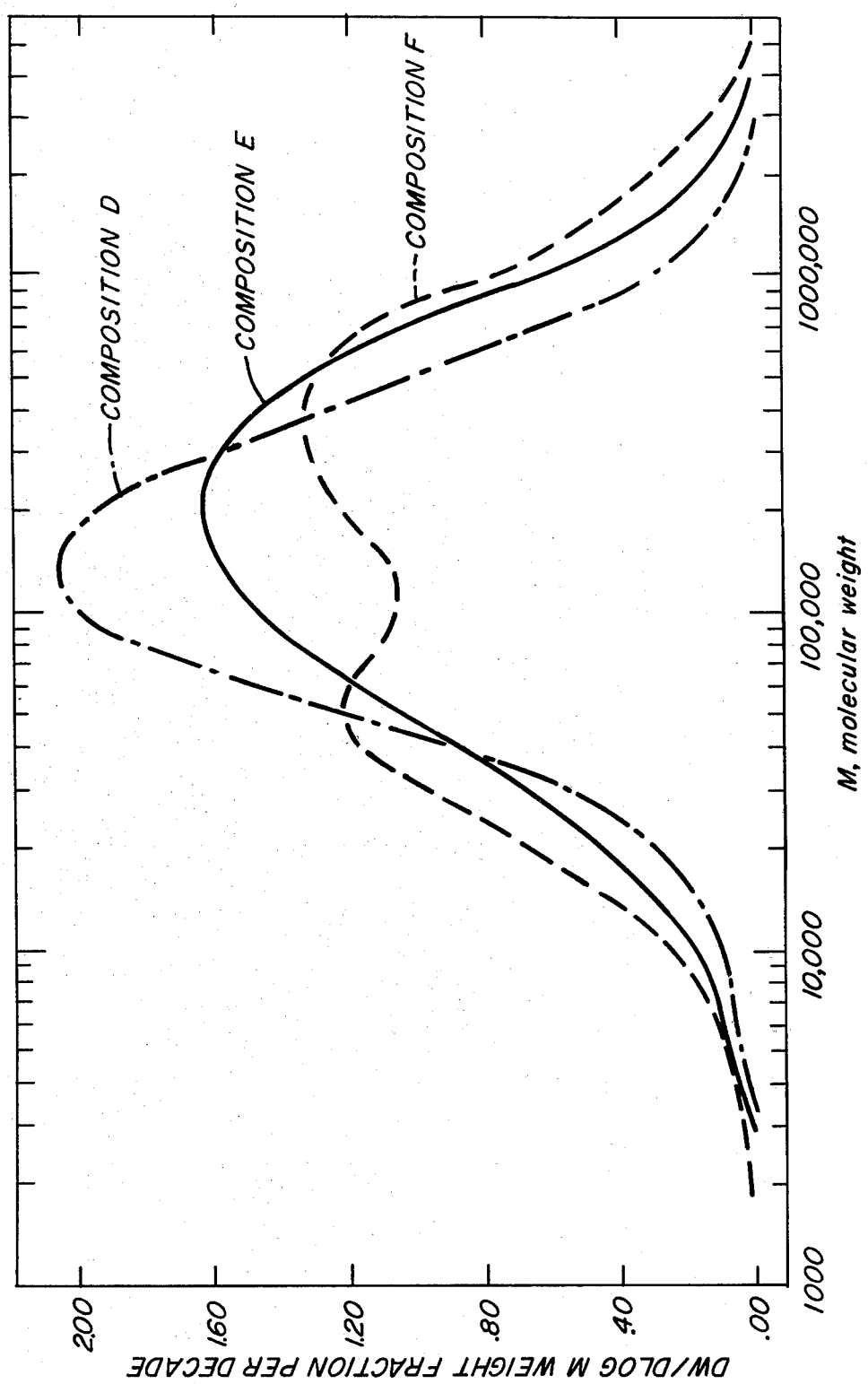

Easy Flow. The molecular-weight distribution of the easy-flow material of the present invention containing 3.85% mineral oil ("Composition F") is plotted in FIG. 2 with comparable materials, i.e. a common commercially available "easy-flow" crystal polystyrene containing mineral oil and a relatively low molecular weight ("Composition D"), and a second common commercially available, relatively broad molecular weight "easy-flow" crystal polystyrene ("Composition E"). Molecular-weight averages are given in Table III. The pilot-plant resin not only had a significantly broader distribution than the conventionally made suspension polystyrene, Composition D, but also had a slightly broader distribution than the bulk polymer, Composition E. The principal distribution difference between the pilot plant material and Composition E is that the pilot plant material F contains a larger fraction below 40,000 and above 500,000 with less in the middle range.

Table II

Characterization and Physical Properties of High Heat Polystyrenes

| Properties | Material | | |
|---|---|---|---|
| | Composition A | Composition B | Pilot Plant Material C |
| $\overline{M}n$ | 94,200 | 68,400 | 58,000 |
| $\overline{M}w$ | 265,200 | 286,400 | 319,300 |
| Residual monomer, % | 0.26 | 0.37 | 0.049 |
| Melt index, g/10 min | 4.09 | 6.05 | 4.53 |

Table II-continued
Characterization and Physical Properties of High Heat Polystyrenes

| Properties | Composition A | Composition B | Pilot Plant Material C |
|---|---|---|---|
| DTUL, °F | 217 | 210 | 217 |
| Vicat, °F | 221 | 214 | 220 |
| Tensile strength, psi | 7,500 | 6,700 | 6,300 |
| Modulus, psi | 491,500 | 454,100 | 464,100 |
| Elongation, percent | 2.19 | 1.66 | 1.51 |
| Rockwell M | 75.2 | 74.7 | 74.7 |
| Izod, ft-lb/in. | 0.50 | 0.48 | 0.44 |
| Flexural strength, psi | 15,000 | 14,400 | 14,500 |
| Modulus, psi | 432,100 | 440,900 | 424,300 |
| Rheology 200° C | | | |
| D | 0.74 | 1.09 | 0.83 |
| $\eta 0$ poises | 76,500 | 97,000 | 51,700 |
| $\eta 1000$ poises | 2,010 | 1,631 | 1,675 |

Conversion Factors
1.8 (F + 460) = K
1 psi = 6.89 kN/m$^2$
1 ft-lb/m = 53.2 N

Table III
Characterization and Physical Properties of Easy-Flow Polystyrenes

| Properties | Composition D | Composition E | Pilot Plant Material F |
|---|---|---|---|
| Mineral oil, percent | | | |
| Added | 2.9 | | 3.85 |
| By analysis | 2.9 | 4.3 | 3.9 |
| $\overline{M}n$ | 78,800 | 54,300 | 50,100 |
| $\overline{M}w$ | 220,800 | 265,700 | 367,600 |
| Residual monomer, percent | 0.36 | 0.50 | 0.11 |
| Melt index, g/10 min | 13.7 | 20.5 | 11.3 |
| DTUL, °F | 190 | 172 | 181 |
| Vicat, °F | 200 | 186 | 192 |
| Tensile strength, psi | 6,300 | 5,600 | 6,100 |
| Modulus, psi | 473,600 | 426,500 | 498,000 |
| Elongation, percent | 1.61 | 1.55 | 1.61 |
| Flexural strength, psi | 13,000 | 12,500 | 12,600 |
| Modulus, psi | 410,900 | 448,100 | 471,900 |
| Rockwell M | 77.3 | 80.0 | 78.8 |
| Izod, ft-lb/in. | 0.58 | 0.42 | 0.43 |
| Rheology 200° C | | | |
| D | 0.93 | 1.06 | 1.14 |
| $\eta 0$ poises | 27,600 | 20,750 | 23,700 |
| $\eta 1000$ poises | 1,285 | 1,075 | 1,060 |

Conversion Factors
1.8 (F + 460) = K
1 psi = 6.89 kN/m$^2$
1 ft-lb/m = 53.2 N

Physical Properties

High Heat. The physical properties of our bimodal product are compared in Table II. Composition A exhibits slightly higher tensile strength and tensile elongation than the broad-distribution polymers B and C. B shows a lower Vicat and DTUL than the other materials. It is difficult to explain the lower DTUL and Vicat of B; the most likely explanation is the presence of a small amount, perhaps 1 percent, of very low molecular weight polystyrene dimer, trimer, and tetramer which is not detectable by chromatography above the base line.

Easy Flow. The data in Table III show the new product, F, and the commercial product E are essentially equivalent in tensile and flexural strength. The three resins differ significantly in thermal properties, with the new product intermediate between Compositions D and E. These differences are due in large measure to the different level of mineral oil and residual monomer in the three materials. Residual monomer is lower in the pilot-plant resin than in either of the commercial materials.

Rheology

High Heat. Capillary rheology data for the three high-heat polymers are summarized in Table II. The values of $n_{1000}$ (the viscosity at a shear rate of 1000 sec$^{-1}$) at 200° C (473 K) for the two broad-molecular-weight-distribution polymers are about equal and lower than that of Composition A. As is known in the art, high shear-rate viscosities are of most significance for correlations with injection-molding performance. The zero-shear viscosities, $n_o$, and melt indexes give an indication of the relative behavior of the polymers at lower shear rates, and do not correlate with injection-molding performance.

The D values in Table II indicate the relative shear sensitivity of the polymers; the flow of the broad-distribution polymers shows greater sensitivity to shear stress (higher D values) than that of a conventional suspension polymer. Thus, if two polymers have equal melt indices (low shear rate viscosity), the one with the higher D value will have the higher flow rate in injection molding at high shear rates.

Easy Flow. The rheological data for the easy-flow resins summarized in Table III parallel the corresponding data for high-heat polymer. The broad-distribution polymers have lower values of $n_{1000}$, about the same value for $n_o$, and larger D values.

Injection Molding

Relative injection-molding performance within the high-heat and easy-flow series on a 9-ounce Husky machine with a 4-cavity cocktail-cup mold is detailed in Table IV. Corresponding performance in a 9-ounce Reed machine with a 4-cavity comb mold is detailed in Table V. All resins had the same lubrication of 2000 ppm stearic acid applied internally during extrusion pelletization and 100 ppm Chemetron wax applied externally to the extruded pellets.

High Heat. The performance (Table IV) of the A, B and C resin on the Husky machine with a thin-wall mold was poor but equivalent. Since high-heat resins fill the thin-wall mold only with extreme difficulty, the comb mold in a Reed machine gives a more meaningful performance comparison. Equivalent performance was obtained in the comb mold with Composition B and the experimental material C. Composition A was moldable at the same temperature and hydraulic pressure, but being a more viscous polymer, required a more open position of the speed selector valve to fill the mold under the high-shear-rate conditions of injection molding.

Easy Flow. The relative performance (Table V) of D, E and F showed that the new easy-flow resin filled the thin-Wall cup mold at conditions intermediate between those for D and E, with Composition D requiring a higher temperature to fill the mold at a given pressure.

Table IV

Thin-Wall Molding Evaluation Data on Husky Machine

| Material | Front Heater, °F | Injection Time, sec | Clamp Closed, sec | Clamp Open, sec | Injection Fill, psig | Pressure Short, psig | Mold Temp, °F | Rejects | Shots per Minute |
|---|---|---|---|---|---|---|---|---|---|
| High-Heat Resins | | | | | | | | | |
| C | 550 | 0.9 | 1.5 | 0.8 | 1000 | 950 | 60 | Frequent | 12 |
| B | 550 | 0.9 | 1.5 | 0.8 | 1000 | 950 | 60 | " | 12 |
| Easy-Flow Resins | | | | | | | | | |
| F* | 475 | 1.5 | 1.7 | 0.0 | 1250 | 1300 | 56 | 0 | 13 |
| E | 475 | 1.5 | 1.7 | 0.0 | 1150 | 1100 | 64 | 0 | 13 |
|  | 500 | 1.5 | 1.7 | 0.0 | 950 | 900 | 62 | 0 | 14 |
| D | 505 | 0.8 | 1.8 | 0.0 | 1150 | 1100 | 52 | 0 | 14 |

*Data obtained on 9-ounce Husky Injection Molding Machine with 4 cavity cocktail cup mold.

Conversion Factors
(F + 460)/1.8 = K
1 psi = 6.89 kN/m$^2$
1 ounce = 0.028 kg

Table V

Molding Evaluation Data on Reed Machine

| Material | Mold Temp, °F | Molding Pressure, Short Shot, psig | Selector Setting |
|---|---|---|---|
| C | 410 | 1000 | 250 |
|  | 450 | 1000 | 235 |
| B | 410 | 1000 | 245 |
|  | 450 | 1000 | 225 |
| A | 410 | 1000 | 375 |
|  | 450 | 1000 | 270 |

*Data obtained on the 9-ounce Reed Injection Molding Machine with 4-cavity comb mold.

Conversion Factors
(F 460)/1.8 = K
1 psi = 6.89 kN/m$^2$
1 ounce = 0.028 kg

Conclusions

High Heat. Rheological data and injection-molding tests demonstrated that broad molecular-weight distribution improved melt-flow performance under high-shear-rate conditions typical of injection-molding processes. Thus, Composition C, having broadened distribution, has a lower viscosity at high shear rates, and correspondingly, an increased rate of filling of molds at any given temperature. Compositions A and C have equivalent physical properties otherwise.

Easy Flow. Broadening the molecular-weight distribution increased melt flow at high shear rates as with the high-heat resins. An additional increment of melt flow at high and low shear rates can be obtained by increasing the mineral-oil level from 3 to 4 percent without excessive reduction of vicat and DTUL. Thus, it may be seen that my invention includes a method of making polystyrene having a bimodal molecular weight distribution comprising (a) polymerizing 100 parts by weight styrene in the presence of at least about 0.05 parts low-temperature peroxide initiator and at a temperature of from 80° C to 110° C to the point where at least about 70% of the styrene monomer is polymerized, (b) thereafter adding to the polymerization mixture about 100 to about 300 parts additional styrene and continuing to conduct the polymerization reaction in the presence of a high-temperature initiator and at a temperature of from 80° C to 150° C until residual monomer is less than about 0.5% of the polystyrene product. In this context, the term "low-temperature initiator" means one with a half-life of 1 to 3 hours at 85° C. Examples of such initiators are benzoyl peroxide, acetyl peroxide, t-butyl peroxyisobutyrate, p-chlorobenzoyl peroxide, 2,5-dimethyl-2,5 bis (2-ethyl hexanoylperoxy) hexane, and t-butyl peroctoate. A "high-temperature initiator" is one which has a half-life of from 0.3 to 3 hours at 130° C, for example, t-butyl perbenzoate, t-butyl peracetate, di-t-butyldiperoxyphthalate, dicumyl peroxide, and a,a, bis (t-butyl peroxy) diisopropylbenzene.

I do not intend to be restricted to the above specific examples and illustrations. My invention may be otherwise practiced within the scope of the following claims.

I claim:

1. Method of making polystyrene having a bimodal molecular weight distribution by suspension polymerization comprising (a) polymerizing 100 parts by weight styrene in the presence of at least about 0.05 parts low-temperature peroxide initiator and at a temperature of from 80° C to 110° C to the point where at least about 70% of the styrene monomer is polymerized, (b) thereafter adding to the polymerization mixture about 100 to about 300 parts additional styrene and continuing to conduct the polymerization reaction in the presence of a high-temperature initiator and at a temperature of from 80° C to 150° C until residual monomer is less than about 0.5% of the polystyrene product.

2. Method of claim 1 in which the initiator is present in step (a) in concentrations of about 0.3 to about 2.0 parts per 100 parts styrene.

3. Method of claim 1 in which the low-temperature initiator is benzoyl peroxide.

4. Method of claim 1 in which the temperature in step (a) is about 85–110° C.

5. Method of claim 1 in which the temperature is controlled during step (a) to maintain the initiator half-life at about 0.5–2 hours.

6. Method of claim 1 in which the high-temperature initiator is t-butyl perbenzoate.

* * * * *